No. 742,488. PATENTED OCT. 27, 1903.
R. B. POLK.
APPARATUS FOR TREATING CANNED GOODS.
APPLICATION FILED DEC. 27, 1900.
NO MODEL. 9 SHEETS—SHEET 1.
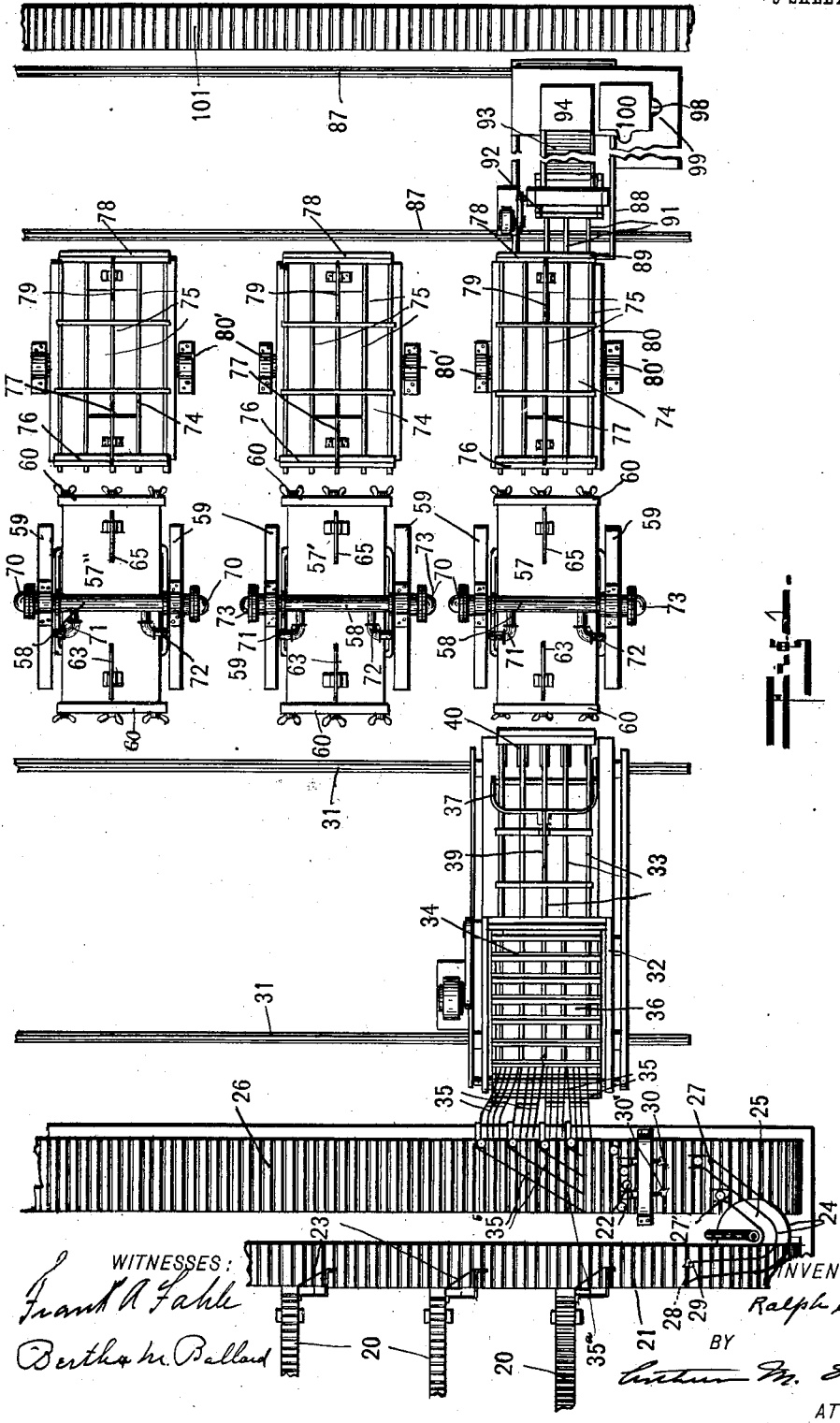
WITNESSES:
Frank A. Fahle
Bertha M. Ballard
INVENTOR
Ralph B. Polk
BY
Arthur M. Hood
ATTORNEY

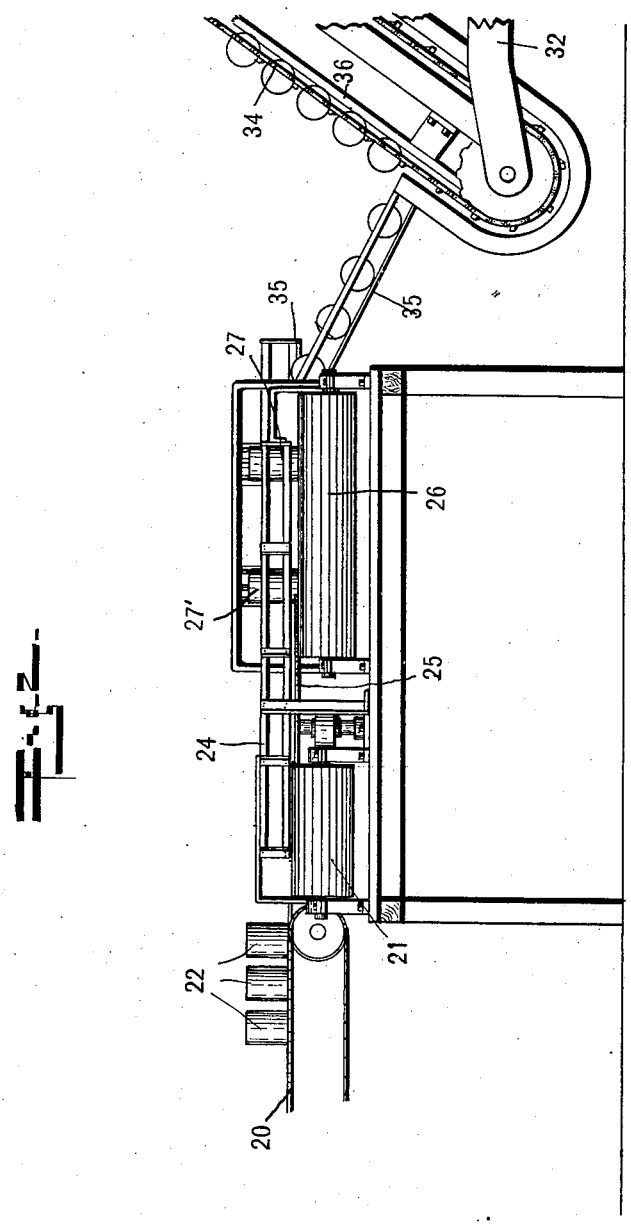

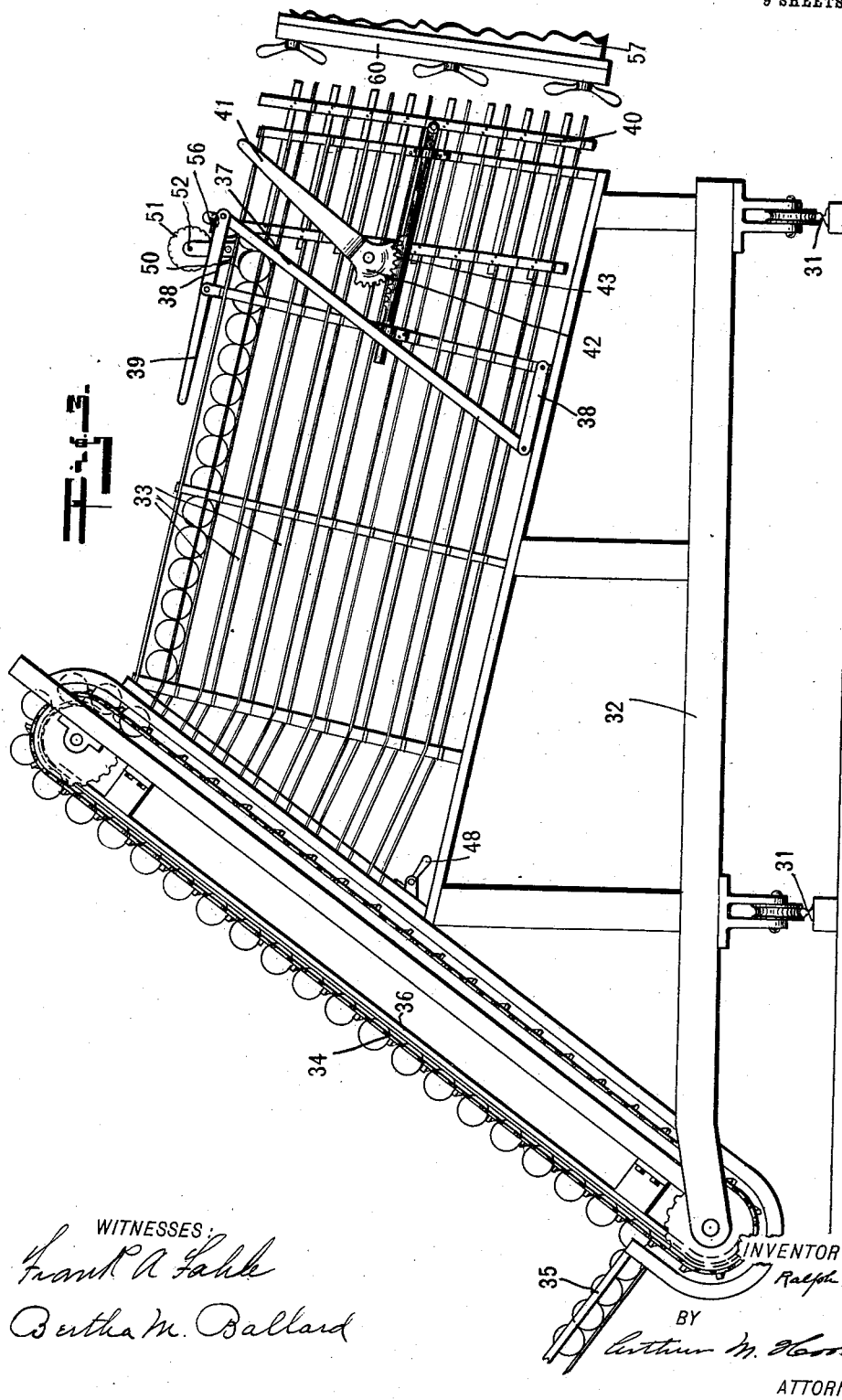

No. 742,488. PATENTED OCT. 27, 1903.
R. B. POLK.
APPARATUS FOR TREATING CANNED GOODS.
APPLICATION FILED DEC. 27, 1900.
NO MODEL.
9 SHEETS—SHEET 4.
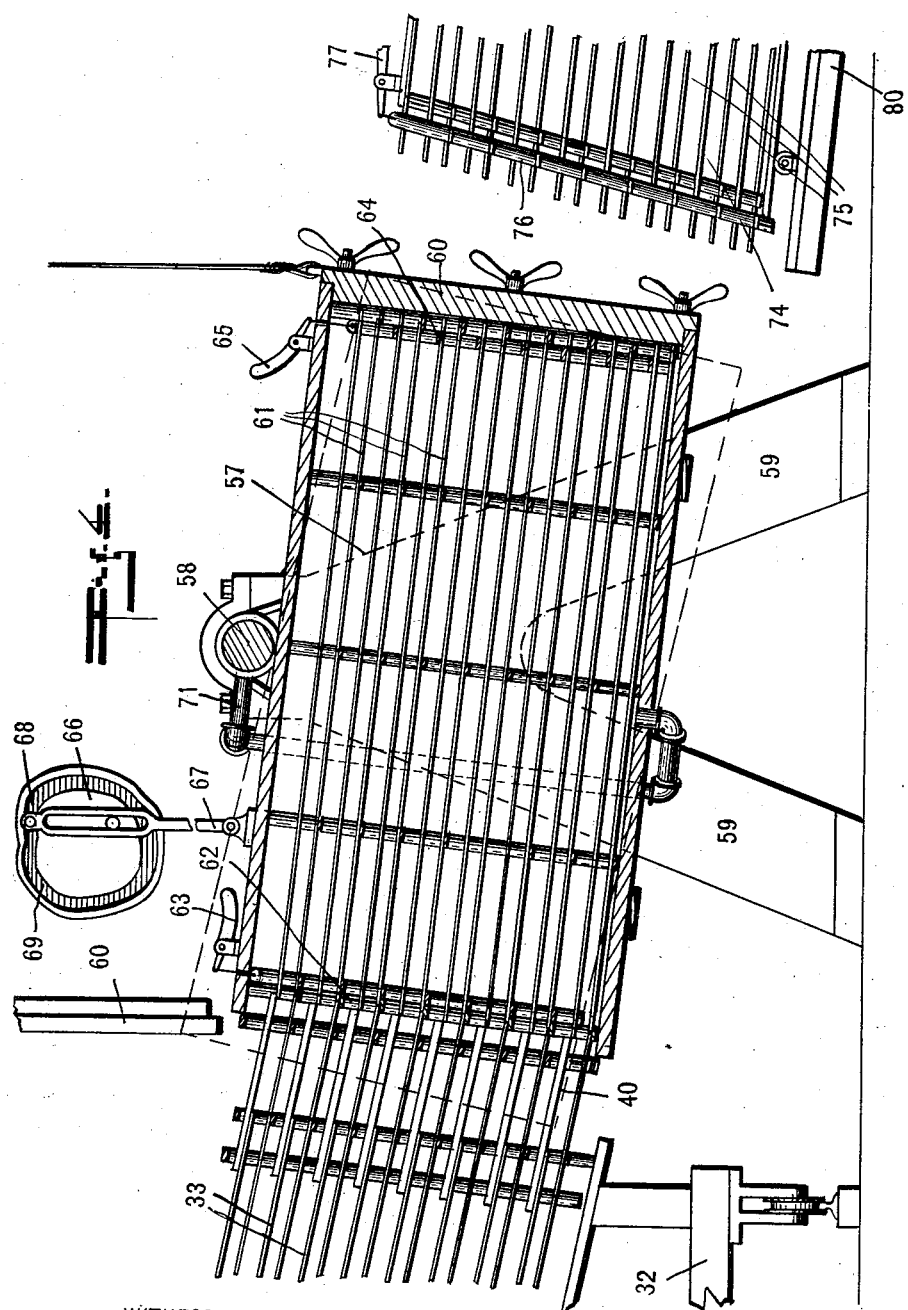
WITNESSES:
Frank A Fahle
Bertha M. Ballard
INVENTOR
Ralph B. Polk
BY
Arthur M. Hood
ATTORNEY No. 742,488. PATENTED OCT. 27, 1903.
R. B. POLK.
APPARATUS FOR TREATING CANNED GOODS.
APPLICATION FILED DEC. 27, 1900.
NO MODEL. 9 SHEETS—SHEET 5.
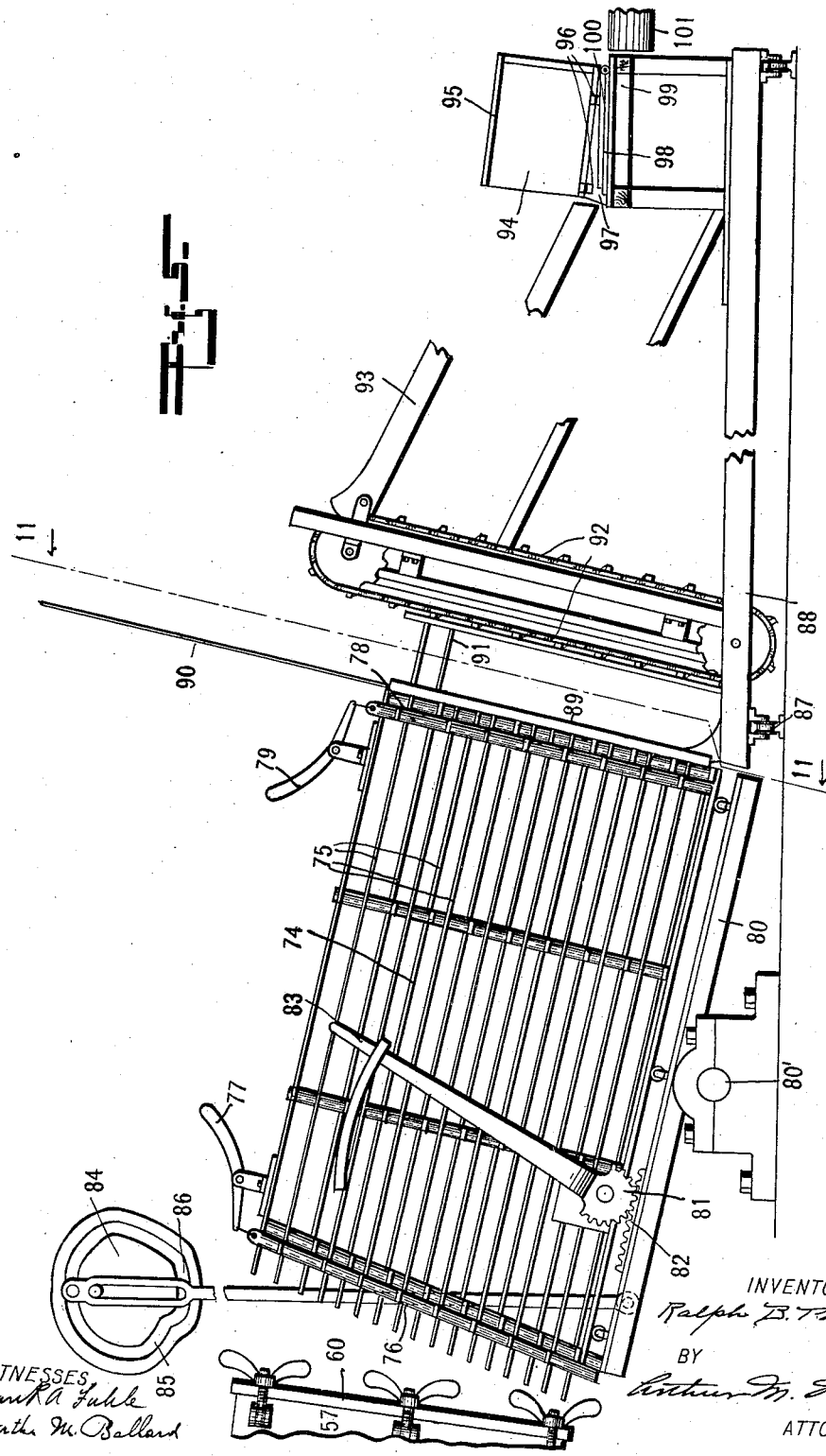

No. 742,488. PATENTED OCT. 27, 1903.
R. B. POLK.
APPARATUS FOR TREATING CANNED GOODS.
APPLICATION FILED DEC. 27, 1900.
NO MODEL. 9 SHEETS—SHEET 6.
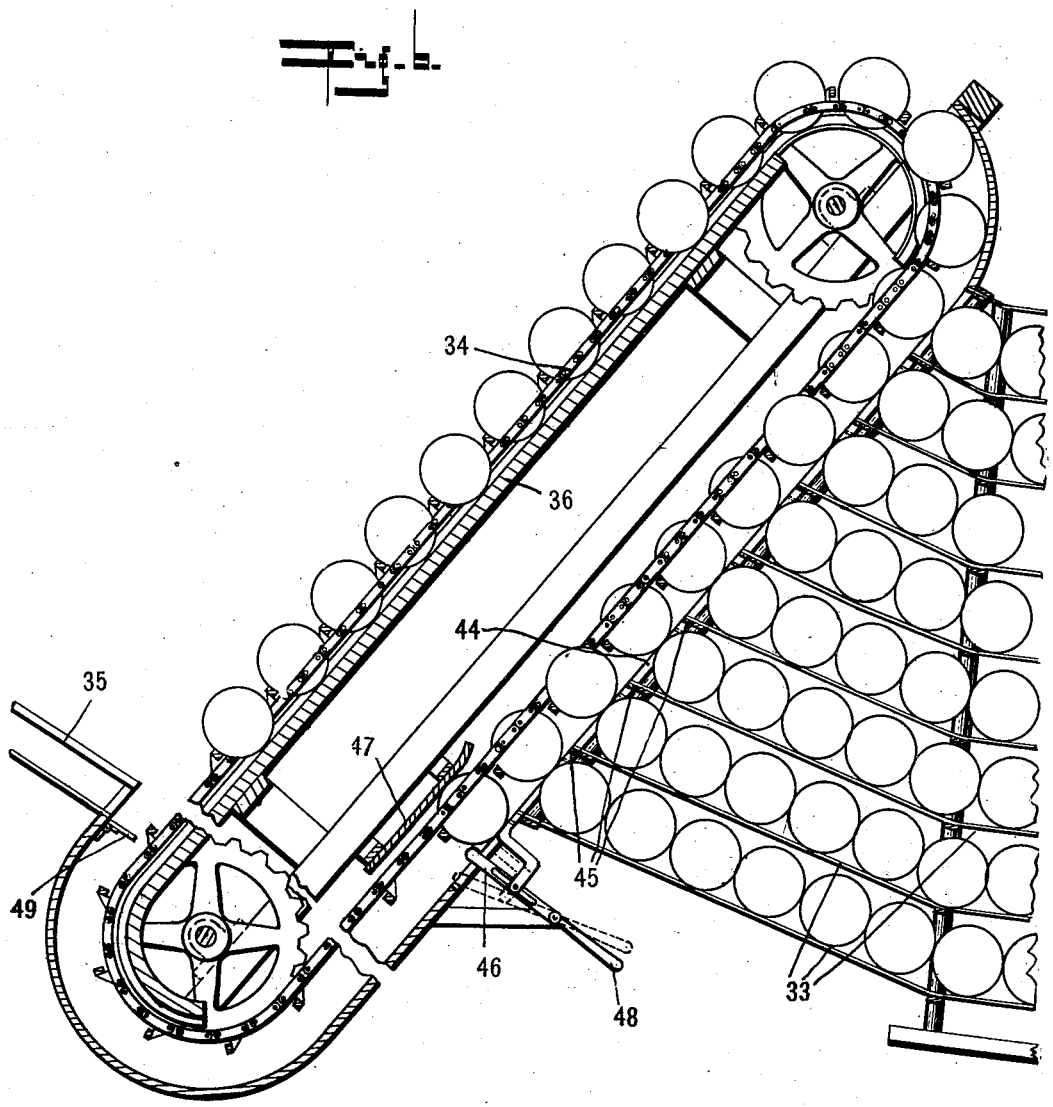

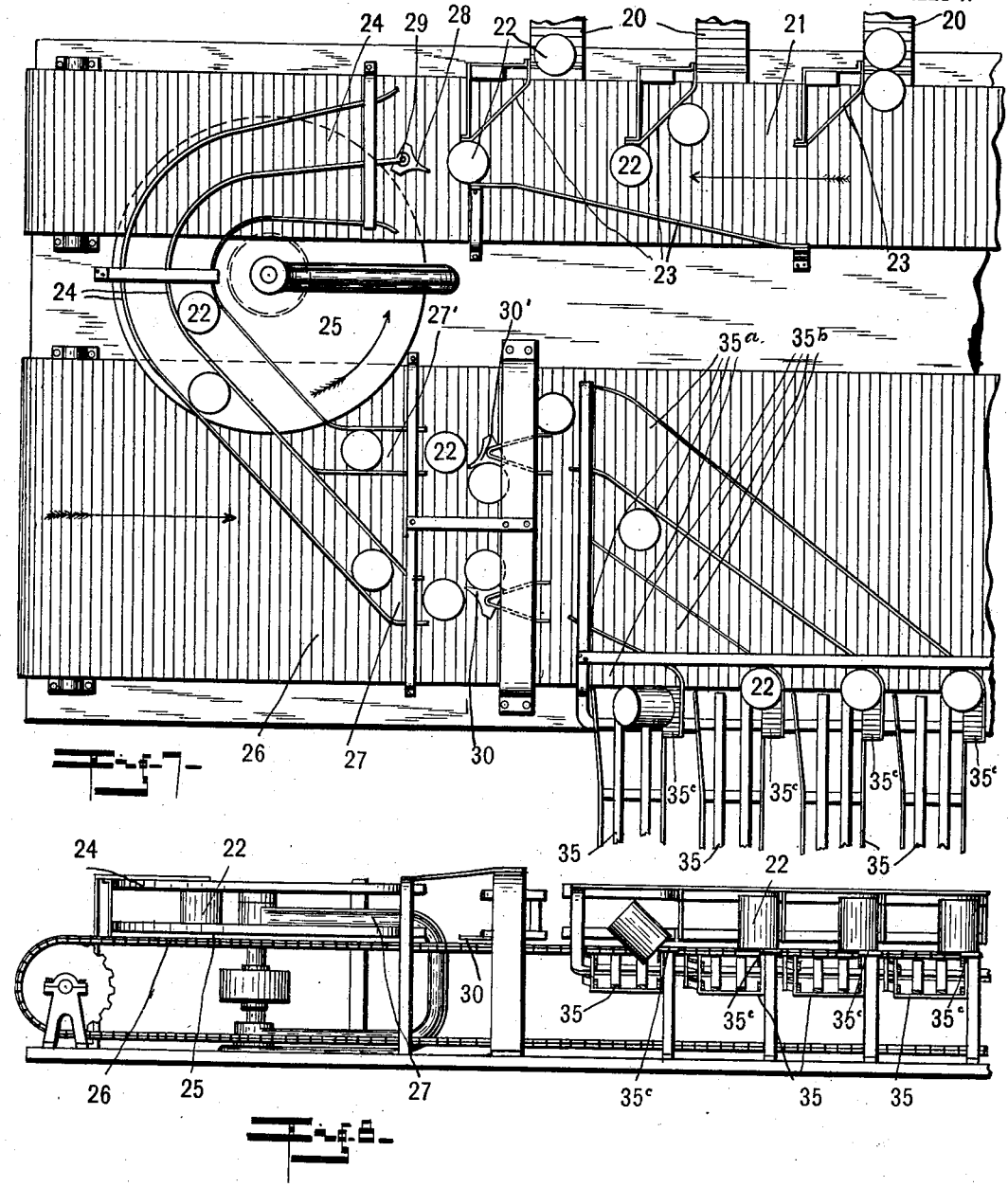

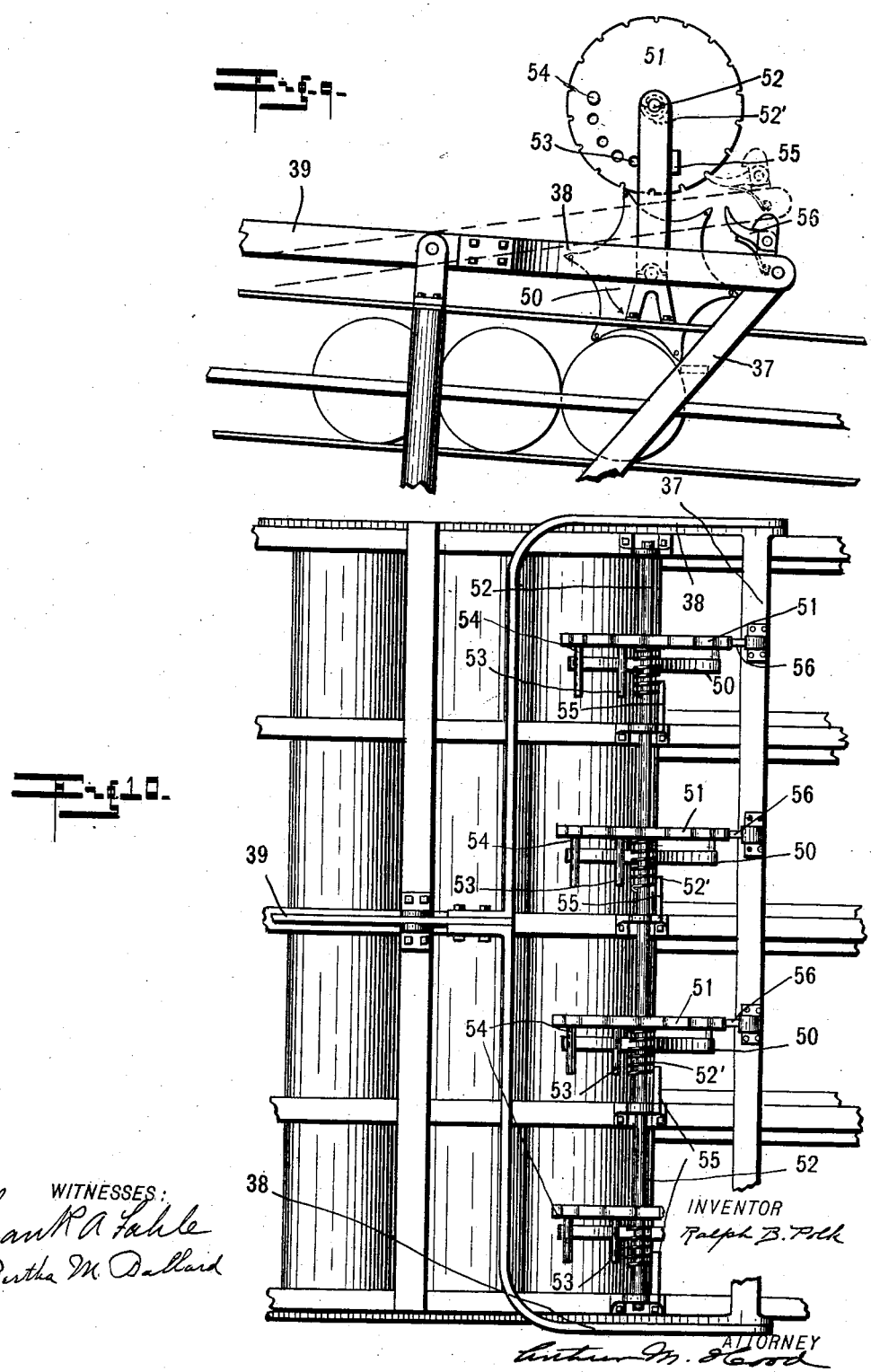

No. 742,488. PATENTED OCT. 27, 1903.
R. B. POLK.
APPARATUS FOR TREATING CANNED GOODS.
APPLICATION FILED DEC. 27, 1900.
NO MODEL. 9 SHEETS—SHEET 9.
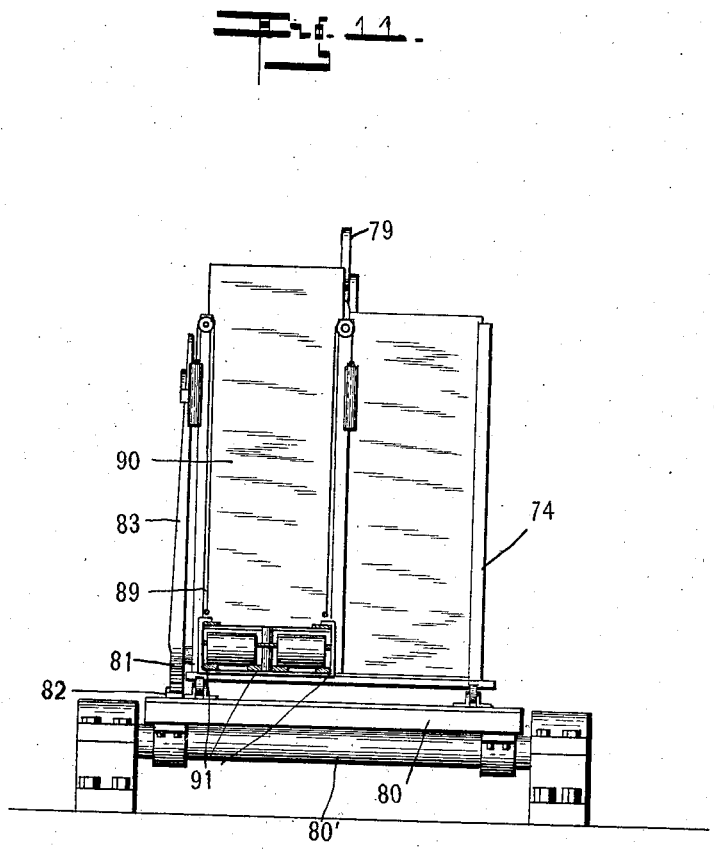
WITNESSES
INVENTOR
BY
ATTORNEY No. 742,488. Patented October 27, 1903.

UNITED STATES PATENT OFFICE.

RALPH B. POLK, OF GREENWOOD, INDIANA.

APPARATUS FOR TREATING CANNED GOODS.

SPECIFICATION forming part of Letters Patent No. 742,488, dated October 27, 1903.

Application filed December 27, 1900. Serial No. 41,185. (No model.)

*To all whom it may concern:*

Be it known that I, RALPH B. POLK, a citizen of the United States, residing at Greenwood, in the county of Johnson and State of Indiana, have invented a new and useful Apparatus for Treating Canned Goods, of which the following is a specification.

My invention relates to an improvement in a system of machines for treating canned goods.

At the present time canned goods is handled manually several times between the time it leaves the capping-machine to the time it is ready to be packed away for the development of improperly-sealed cans and preparatory to the attachment of labels. A process of this kind requires considerable space and also requires a large number of operators. After the filled can has left the capping-machine it is now customary to place a large number of sealed cans in a basket, which is then lowered into a steam-vat, where it is allowed to remain until the material within the cans has become heated through. This process requires considerable time, varying according to the character of the goods in the cans. It is necessary in this process that the heat shall be carefully regulated in order that the outside portion of the goods be not cooked more than the interior.

The object of my present invention is to produce a system of machines adapted to receive the filled cans from the capping-machines, to deposit said filled cans in any one of a series of cooking vessels or retorts, to cause an intermittent rolling of the cans while in the retort in order that the material therein may be uniformly heated throughout, to transfer the heated cans to a cooling-rack, where they may be quickly and uniformly cooled, and to transfer the cooled cans from the cooling-rack into boxes, within which they may be stored until the time arrives for attaching labels, &c. To these ends I have provided means for receiving the capped cans from the several capping-machines, means to introduce these cans into a rack consisting of a series of rows of track-like receptacles, means by which said rack may be brought opposite any one of a series of cooking-retorts and by which the cans may be automatically transferred from said rack into any one of said retorts, means for rocking said cooking-retorts, an oscillating cooling-rack opposite each retort, whereby the cooked contents of a retort may be transferred to a cooling-rack and a new charge inserted into the retort, so that the cooling of the preceding charge may take place simultaneously with the cooking of the new charge, and a boxing-machine which may be brought opposite and into coöperation with any one of the series of cooling-racks.

The accompanying drawings illustrate my invention.

Figure 1 is a diagrammatical plan of the entire system. Fig. 2 is a side elevation of the receiving-belt and adjacent separating mechanism. Fig. 3 is a side elevation of the racking-frame. Fig. 4 is a central vertical section of one of the retorts. Fig. 5 is a side elevation of the cooling-rack and boxing-machine. Fig. 6 is an enlarged sectional detail of the receiving end of the racking-frame. Fig. 7 is a plan of the dividing mechanism arranged between the capping-machines and the racking-frame. Fig. 8 is a side elevation thereof. Fig. 9 is a side elevation of a locking mechanism at the discharge end of the racking-frame. Fig. 10 is a plan thereof. Fig. 11 is a section on line 11 11 of Fig. 5.

In the drawings, 20 20 indicate the discharge-belts of a series of capping-machines, all of which discharge upon an endless carrier 21, moving in the direction indicated by the arrow. The capped cans 22 are discharged upon the carrier 21 and are brought into a single file by suitable guides 23 mounted thereover. By means of suitable guides 24 and a comparatively thin revolving disk 25 the cans are transferred from carrier 21 to a carrier 26 parallel with carrier 21 and moving in the opposite direction. Disk 25 is arranged with one side passing beneath the carrier 21 and the other side above carrier 26.

*The dividing mechanism.*—For the sake of convenience and compactness it is advisable that the cans be arranged in several series, both horizontal and vertical, and for reasons hereinafter apparent these cans should be turned from their ends to their sides. The division and rearrangement of the cans may take place at any desired point, either entirely upon carrier 21 or entirely upon carrier 26; but I prefer the arrangement now to be described.

As previously stated, the cans 22 after their discharge from the capper-belts 20 are arranged by guides 23 in single file upon the carrier 21. Duplicate guides 24 are arranged over disk 25 and the adjacent portions of belts 21 and 26, so as to form a pair of can-channels 27 and 27'. At the receiving end and between the two channels 27 and 27' I mount what I term a "divider" 28, which is pivoted near its rear end at 29 so that its forward tapered end may be caused to lie upon either side of the medial line of the single file of cans 22 on carrier 21. The rear end of the divider extends upon each side of the pivot and forms a pair of arms which when engaged by a can swing the divider so as to bring its forward end or point to the same side of the medial line as the passing can. The succeeding can therefore engages the opposite side of the divider and its passage returns the divider to the initial position. The cans are thus thrown alternately into the channels 27 and 27'. The combined result of the movement of the carrier 21 and the resistance of guides 24 is a diagonal movement of the cans through channels 27 and 27' and the deposit of said cans upon disk 25. The movement of this disk in connection with guides 24 causes a radial movement of the cans on the disk and a deposit thereof upon carrier 26, which carrier causes a continued movement of the cans through the channels 27 and 27'.

The racking-frame, described hereinafter, is provided with vertical tiers of horizontal tracks in sets of four for the reception of cans, and it is therefore necessary to again divide the cans after they have reached the carrier 26. For this purpose I mount in front of the discharge end of the channel 27 a divider 30 and in front of channel 27' a divider 30', the actions of which result in an alternate transverse shifting of the cans of each series into four distinct rows, which will be then carried along carrier 26. The carriers 21 and 26 and disk 25 may be driven by any desired means.

*The racking-frame.*—Laid parallel with carrier 26 is a track 31, along which is movable a truck 32, which carries the racking-frame. The racking-frame consists of a series of can-receiving tracks 33, which are arranged in both horizontal and vertical series and at an angle to the horizontal sufficient to allow any cans introduced therein to roll of their own weight along the same. The number of tracks in each horizontal series corresponds to the number series of cans finally produced upon carrier 26. Mounted at the receiving ends of tracks 33 is an endless belt 34, which extends the entire width of the frame and is adapted to receive as many transverse rows of cans as there are horizontal series of tracks 33. The cans are received upon the upper side of belt 34 from chutes 35, the cans resting upon a platform 36, beneath the upper side thereof. The dividers 30 and 30' upon carrier 26 have produced four rows of cans upon said carrier. It is necessary to transfer each row of these cans from carrier 26 to the proper chute 35 and at the same time to turn said can from its end to its side. For this purpose I provide the following mechanism: Secured to chutes 35 and extending diagonally over carrier 26 is a series of guides $35^a$, forming four can-channels $35^b$. Immediately adjacent the near side of carrier 26 and at the mouth of each chute 35 I provide a platform $35^c$, which is on a level with the upper face of the carrier and forms an extension of said carrier to one side of its chute 35. The platform $35^c$ is a trifle narrower than one-half of the diameter of the cans 22. By this arrangement the can as it is forced transversely across the carrier 26 by the guides $35^a$ is forced upon shelf $35^c$ and is supported by the carrier and platform until it has been crowded entirely upon the platform by the succeeding can. As soon as this occurs the can becomes unbalanced, due to the narrowness of the platform, and of its own weight tips through an angle of ninety degrees and falls into the adjacent chute 35, through which it rolls to the elevator 34. The cans are carried around the upper end of the elevator and drop into the upper row of tracks 33. When said tracks have become filled, the last can lies at the receiving end and the following can passes by and drops into the next lower track, such action continuing until the tracks are all filled. The first can passing into each track is stopped by a gate 37, located near the discharge end of the rack and parallel to the receiving end. Gate 37 is mounted at each end upon links 38 and may be moved longitudinally by a handle 39, the arrangement of the gate 37 being of course such that each track 33 will contain the same number of cans. Mounted at the discharge end of the track is a telescopic extension 40, which forms an extension to each of the tracks 33, and said frame may be extended or retracted by means of the lever 41, operating a pinion 42, engaging a toothed bar 43, secured to said telescopic extension. Elevator 34 may be continuously operating, so that when the lowest track 33 has been filled the condition of the machine is that shown in Fig. 6. In order that when the cans in the rack are released the passage of more cans into the tracks may be prevented for a time, I provide a gate 44, which carries a series of cross-bars 45, which may be moved down across the mouth of each of the tracks 33, except those of the upper horizontal series. Gate 44 is automatically closed by means of a lever 46, the upper end of which lies in the path of movement of the first can which passes the lower track 33. This can is held down, so as to compel the operation of the lever, by means of the shoe 47. For convenience a handle 48 is secured to lever 46, by which the gate may be opened by the operator. As soon as gate 44 has been closed the cans carried by the elevator 34 pass completely around the same. At the same time the chutes 35 will probably contain one or more cans, and in order that there may be no choking I mount at the mouth of each chute 35 a gate 49, which normally forms a continuation of its chute. After a can has been carried completely around elevator 34, however, and comes beneath gate 49 it will yield upwardly, so as to allow the passage of said cans and at the same time close the mouth of the adjacent chute 35, so as to retain any cans which may be therein. It is also advisable in order that the machine may not become choked that the upper rows of tracks 33 be at all times open for the reception of cans. In order that no more cans may pass from the upper tracks than pass from the lower tracks when the gate 37 is open, I provide at the discharge end of the upper tracks 33 the locking mechanism shown in Figs. 9 and 10. This mechanism is independent for each track, and each consists of a star-wheel 50, having its arms arranged in the path of movement of cans 22. Geared to wheel 50 is a counter-wheel 51, loosely mounted upon its arbor 52 and attached to one end of a spring 52', which tends to resist rotation of the wheel in the direction indicated by the arrow. Counter 51 is provided with a pair of stops 53 and 54, stop 54 being adjustable circumferentially toward and from stop 53, and each of said stops is arranged to be brought into engagement with a stationary support 55. Secured to lever 38 of the gate 37 is a pawl 56, which when gate 37 is open is brought into engagement with the gear-teeth of counter 51, so as to prevent a rotation of said counter in the direction in which it is urged by spring 52'. As soon as gate 37 is opened the cans 22 in the tracks 33 roll downward along said tracks and those in the upper tracks pass beneath star-wheel 50, causing a rotation thereof, so as to cause a step-by-step advancement in the direction indicated by the arrow of the counter 51 against the action of spring 52'. Counter 51 is advanced one step by the passage of each can, and the number of cans may be controlled by shifting stop 54, said stop when brought into engagement with the support 55 preventing any further rotation of the star-wheel 50, and thus preventing the passage of more than a predetermined number of cans. When gate 37 is closed, pawl 56 is withdrawn from engagement with counter 51, and thus allowing it to be returned by spring 52 to its normal position, with stop 53 in engagement with support 55. The new series of cans in the upper tracks 33 are then held in by gate 37. As a result of the locking mechanism just described the receiving ends of the upper tier of tracks 33 should be always open and gate 44 does not operate in connection with said tier. If desired, locking mechanism of the kind just described may be placed at the discharge end of each track, in which case gate 44 and its operating mechanism may be dispensed with.

*The cooking-retorts.*—Mounted alongside track 31 is a series of retorts 57 57' 57'', &c. Each of said retorts is supported upon a transverse trunnion 58, supported in suitable standards 59. Retort 57 is water and steam tight and is provided at each end with a removable door 60. Within the retort I arrange a series of tracks 61, extending longitudinally thereof and corresponding in number and arrangement to the tracks 33 of the racking-frame. I mount at the receiving end of tracks 61 a gate 62, operable from the outside by lever 63, and at the discharge end a similar gate 64, operable by lever 65. The distance between gates 62 and 64 is somewhat greater than the length occupied by the number of cans contained in any one of the tracks 33, the said distance being preferably at least three can diameters greater, so that when the retort is oscillated there will be an opportunity for the complete rotation of each can as it rolls along the tracks. Any suitable means may be used to oscillate the retorts; but for convenience I prefer to use a cam 66, connected by a pitman 67 with one end of the retort. Cam 66 is provided with two periods of rest 68 and 69, the purpose of which will hereinafter appear. Steam is preferable for the cooking medium and is introduced into the retort through one end of the trunnion from a pipe 70 and pipes 71. The exhaust passes through pipes 72 and 73 and the other end of the trunnion, which is hollow only at each end.

*The cooling-rack.*—Mounted end to end adjacent each retort 57 57' 57'', &c., is a cooling-rack 74, which is substantially the same length as the interior of the retort and is provided with a series of tracks 75, the same in number and arrangement as tracks 61. The rack 74 is provided at its receiving end with a gate 76, operable by lever 77, and at its discharge end with a gate 78, operable by a lever 79. This rack is preferably skeleton in form and is mounted upon an oscillating platform 80, supported upon trunnions 80'. In order that the tracks 75 of rack 74 may be brought into close connection with the track 61 of its retort, the whole skeleton is longitudinally movable upon platform 80 by means of pinion 81 and the toothed rack 82, the frame being held in either of its positions by securing the operating-lever 83. Platform 80 may be tilted by any desired means; but I prefer to use a cam 84, similar to cam 66 and provided with similar rests 85 and 86. As soon as the cans are introduced into the cooling-rack, gate 76 is closed and the whole frame oscillated, so as to cause the cans to roll from end to end. During this time cold water is thrown in a spray over the cans, so they are quickly cooled.

*The boxing-machine.*—The cooled cans from the cooling-racks may be disposed of in any desired manner. If desired, they may be discharged directly into a labeling-machine. It is desirable, however, before labeling that the cans be allowed to stand for a limited period in order that any imperfectly-sealed cans may develop. For convenience in storing, therefore, I deem it advisable to place these cans in the cases in which they are to be finally shipped, and for this purpose I provide the boxing-machine now to be described.

Parallel with track 31 at the discharge ends of the cooling-racks 74 74′, &c., I lay a track 87, upon which is mounted a truck 88. Truck 88 carries at its receiving end a stationary stop 89, adapted to close the ends of any two vertical series of tracks 75 of any one of the cooling-racks. Alongside stop 88 and mounted in suitable guides is a vertically-movable door 90, adapted to close the other two vertical series of tracks 75. Door 90 carries at its lower end a chute 91, which registers with the two vertical series of tracks 75 opposite door 90 and which discharges into an elevator 92, which in turn discharges into a swinging spout 93, capable of receiving two series of cans placed end to end. The discharge end of spout 93 lies adjacent a boxing device, also carried upon truck 88. The peculiar construction of this boxer consists of a three-sided receptacle 94, the open end of which lies immediately adjacent the free end of the swinging spout 93. The upper side of receptacle 94 is normally closed by a leaf 95, hinged to one of the sides, and the receptacle 94 is hinged along its lower edge by hinges 96 to base 97. Immediately adjacent the open side of the receptacle 94 is a plate 98, which is hinged upon a horizontal axis on a table 99 along that edge parallel with and immediately adjacent the open side of receptacle 94. Hinged to the upper side of plate 98 along one end, so as to swing at right angles to the line of swing of the plate, is a leaf 100, the arrangement of plate 98 and leaf 100 being such that when the plate is swung about its hinges the leaf 100 will be thrown up, so as to close the open side of receptacle 94. Mounted adjacent table 98 is an endless carrier 101, the purpose of which will appear.

The operation is as follows: The several moving parts are set in motion in the directions indicated by the arrows thereon, and the filled cans are forced from the capper-belts 20 upon the carrier 21 and by it carried between guides 23, so as to form a single file, and presented to the divider 28, which divider operates, as already described, to throw the cans alternately into channels 27 and 27′. The cans by these channels are forced off carrier 21 upon disk 25 and by it advanced through said channels into carrier 26, the two rows of cans being presented by this carrier to the dividers 30 and 30′, which operate to again divide the cans alternately and throw them into line with the mouths of the four channels 35$^b$, formed by guides 35$^a$, the position of said guides over carrier 26 depending upon the position of the racking-frame on track 31. After the cans enter channels 35$^b$ they are forced by the guides 35$^a$ transversely across the carrier and out upon the adjacent platform 35$^c$, where, due to the narrowness of the platform, the can becomes unbalanced as as soon as it has been forced by the succeeding can off of the carrier and turns through an angle of ninety degrees, so as to drop upon its side into the adjacent chute 35, through which it rolls to the elevator 34. The cans reach the elevator 34 end to end in four series and are carried upward by the elevator and dropped into the first or upper tier of tracks 33, the first can in each track being stopped by gate 37. The last can deposited in each of the upper tracks 33 just fills the track, so that the following can passes over and drops into the next lower track. When all of the tracks have been filled, the following can engages lever 46 and closes gate 45. The racking-frame should preferably be placed opposite the cooking-retort to be filled before the frame has been entirely loaded; but if this has not been done the operator brings the filled racking-frame opposite that cooking-retort 57 to be loaded and withdraws the adjacent door 60 thereof. Cam 66 is swung until the point of rest 68 is in engagement with pitman 67, thus throwing the retort into a medial position, in which the inclination thereof is considerably less than the inclination of tracks 33. By swinging lever 41 the extension 40 of the racking-frame is thrown over, so as to bridge the gap between the tracks of the racking-frame and the tracks within the retort 57, as clearly shown in Fig. 4. The operator then opens gate 37, this movement throwing pawl 56 into engagement with counter 51, as shown in dotted lines in Fig. 9. As soon as the gate 37 has been opened all of the cans in the racking-frame roll down tracks 33, across extension 40, and into the tracks of the retort 57, the speed of the cans being checked within the retort, due to the smaller inclination of the tracks 61. As the cans in the upper track 33 move downward they pass successively beneath star-wheel 50, thus rotating said star-wheel and causing a step-by-step movement of the counter 51 against the action of spring 52′, the counter being held in its advanced positions by pawl 56. As soon as the cans start from the upper tracks 33 the elevator 34 begins to discharge other cans into them, gate 44 forming no obstruction to these tracks. The passage of the last predetermined number of cans from any one of the upper tracks 33 brings stop 54 of the counter 51 into engagement with the stationary support 55, thus locking that star-wheel and preventing the passage of the succeeding can. As soon as all of the predetermined number of cans have passed from the racking-frame into the retort gate 37 is thrown down, at the same time releasing the counters 51, so that they may be thrown back into their initial position by the action of springs 52'. Gate 44 is also opened by throwing lever 46 back to its normal position. Extension 40 is then withdrawn and door 60 secured in position. The steam or cooking heat is then turned into the retort and cam 66 rotated, so as to cause a slow oscillation of the retort, this movement causing a rolling reciprocation of the cans within the retort. Truck 32 is then moved along its track, so as to bring the racking-frame opposite another retort, within which the cooking process has been completed. This retort is then thrown into the position indicated in dotted lines in Fig. 4, the position of rest 69 of the cam 66 being then in engagement with the pitman 67, and the retort being thus given an inclination sufficient to insure the quick discharge of the cans therefrom. The platform 80 is swung by cam 84 until the pitman is engaged by the first position of rest, the rack then having an angle of inclination less than that of the retort. The discharge-door 60 is removed and the skeleton frame 75 of the adjacent cooling-rack thrown by means of lever 83, so as to form a continuation of the tracks 61 of the retort. Gate 64 is open and the hot cans allowed to roll into the tracks of the cooling-rack, gate 76 thereof having first been opened. As soon as the cans have passed into the cooling-rack gate 76 is closed, the tracks withdrawn from engagement with the retort, and the platform 80 oscillated, with streams of water are thrown upon the hot cans, which roll from end to end of the frame. The discharge-door of the emptied retort is immediately closed and the receiving-door opened and a new set of cans introduced into the retort in the manner already described as soon as the racking-frame has been filled. As soon as the cans have been sufficiently cooled in any one of the cooling-racks the truck 88 is brought opposite the rack and the platform 80 tilted to the position shown in Fig. 5, stop 89 closing the ends of two right-hand series of tracks 75. The vertically-movable door 90 is drawn down to its lowest position, so that chute 91 lies opposite to the lowest track. Gate 77 is then opened and the cans from two of the bottom tracks allowed to pass through chute 91 to the elevator 92 and by it lifted and discharged into the swinging spout 93. Normally the end of spout 93 lies adjacent base 97, the passage of the cans from the spout being normally prevented thereby.

Receptacle 94 is preferably of sufficient size to contain two dozen cans, and the cans are introduced in the following manner: The operator lifts the end of chute 91 until it just clears the bottom of receptacle 94, when eight cans (two series of four) will roll into the receptacle. The spout is then lifted the diameter of a can and eight more cans allowed to roll into position, this operation being repeated a second time. The operator then swings plate 98, with its attached leaf 100, up, so as to close the open side of the receptacle 94, when the receptacle may be turned over through ninety degrees, so as to stand the cans on end upon leaf 100. The leaf 95 is then swung back and the receptacle 94 returned to its initial position. The box (not shown) in which the cans are to be stored may then be slipped over the cans as they are piled upon leaf 100 and the filled box overturned by swinging leaf 100 about its hinged joint until the box rests upon carrier 101, by which it may be carried to any desired distributing-point.

It is to be noticed that this entire system may be operated by not to exceed three operators, one to control and superintend the action of the racking-frame and the introduction of cans therefrom into the retorts, one to operate the cooling-frame, and one to operate the boxing mechanism. By this means the cans are handled, cooked, and cooled practically automatically from the time they leave the capping-machines until they are ready to be stored. It is noticed, further, that during the cooking period the can is continually agitated, so that the material is stirred and uniformly and quickly heated. The stirring being produced by a rolling reciprocation of the can is not violent, however, and does not tend to mash or injure the material.

I claim as my invention—

1. In a system for treating canned goods, a racking-frame, a series of oscillating cooking-retorts, means for bringing the racking-frame into coöperation with any retort, means allowing the transfer of cans from the racking-frame to any retort, and means for oscillating each retort.

2. In a system for treating canned goods, a racking-frame, a series of cooking-retorts, means for bringing the racking-frame into coöperation with any one of the retorts, and means allowing the transfer of cans from the racking-frame into any retort.

3. In a system for treating canned goods, a racking-frame, an oscillatory cooking-retort arranged to receive the cans from the racking-frame and an oscillatory cooling-rack arranged to receive the cans from the retort.

4. In a system for treating canned goods, a racking-frame, a series of cooking-retorts, means for bringing the racking-frame into coöperation with any one of the retorts, means allowing the transfer of cans from the racking-frame into any retort, a series of cooling-racks one for each retort, and means allowing the transfer of cans from each retort to its cooling-rack.

5. In a system for treating canned goods, a racking-frame, a cooking-retort arranged to receive cans from the racking-frame, and a cooling-rack arranged to receive cans from the retort.

6. In a system for treating canned goods, a racking-frame, an oscillatory cooking-retort arranged to receive the cans upon their sides from the racking-frame, and an oscillatory cooling-rack arranged to receive the cans from the retort, the arrangement being such that the cans may be given a rolling reciprocation within the retort and the cooling-rack.

7. In a system for treating canned goods, an oscillatory cooking-retort, means therein for supporting cans upon their sides so that they may be free to roll and means for oscillating the retort so as to cause a rolling reciprocation of the cans therein.

8. In a system for treating canned goods, a cooking retort or vessel, means for supporting several series of cans therein so that they may be free to roll, and means for rolling said cans.

9. In a system for treating canned goods, a cooking retort or vessel, means for supporting several series of cans therein so that they may be free to roll, and means for causing a rolling reciprocation of said cans.

10. In a system for treating canned goods, a cooking retort or vessel adapted to receive the cans so that they may be free to roll, and means for causing a rolling reciprocation of said cans.

11. In a system for treating canned goods, a cooking-retort adapted to receive the cans and allow them to roll therein, and means for rolling said cans therein.

12. In a system for treating canned goods, a racking-frame, consisting of a series of tracks within which the cans may roll, and means for automatically rolling the cans into said tracks.

13. In a system for treating canned goods, a racking-frame, consisting of a series of tracks, within which the cans may roll, arranged in vertical series, and means for delivering cans to said tracks from the top, the arrangement being such that when an upper track is filled the last can therein will operate to cause succeeding cans to pass into the next lower track.

14. In a system for treating canned goods, a racking-frame, consisting of several series of tracks within which the cans may roll, the said tracks being arranged in vertical and horizontal series, and means for automatically rolling the cans into the ends of said tracks.

15. In a system for treating canned goods, a racking-frame, consisting of a series of tracks within which the cans may roll, arranged in vertical series, and means for delivering the cans to the tracks so as to fill them in vertical succession.

16. In a system for treating canned goods, a racking-frame, consisting of a series of inclined tracks within which the cans may roll, said tracks being arranged in vertical series, a can-elevator arranged adjacent the receiving ends of said tracks, and a gate arranged within said tracks substantially parallel with the receiving ends thereof, the arrangement being such that each track will contain the same number of cans.

17. In a system for treating canned goods, a carrier arranged to receive the cans thereon, and means operated by the movement of the can for shifting said cans alternately in opposite directions transversely of the carrier.

18. In a system for treating canned goods, a carrier arranged to receive the cans on end, and means operated by the passage of the can for shifting said cans alternately in opposite directions transversely of the carrier.

19. In a system for treating canned goods, a carrier arranged to receive the cans, and a divider pivotally mounted above the carrier in position to be engaged by the cans and shift them alternately in opposite directions transversely of the belt.

20. In a system for treating canned goods, a carrier arranged to receive the cans on end, and means for engaging said cans and shifting individuals in opposite directions transversely of the carrier.

21. In a system for treating canned goods, a carrier arranged to receive the cans on end, a chute leading from said carrier, and means for turning said cans from their ends to their sides and discharging them into the chute.

22. In a system for treating canned goods, an endless carrier adapted to receive the cans on end, and means for discharging said cans from the carrier and for turning them from their ends to their sides.

23. In a system for treating canned goods, a longitudinally-movable carrier adapted to receive the cans on end, a diagonally-arranged guide mounted over said carrier, and a platform of less width than the can extending transversely from said carrier and forming an extension of said guide, for the purpose set forth.

24. In a system for treating canned goods, a longitudinally-movable carrier, a diagonally-arranged guide mounted thereover, a platform extending transversely of the carrier and forming a continuation of said guide, said platform being of a width less than half the diameter of the can, and a chute, within which the can may roll, mounted below and adjacent said platform.

25. In a system for treating canned goods, a longitudinally-movable carrier adapted to receive the cans on end, a racking-frame, consisting of one or more tracks within which the cans may roll, and means for discharging the cans from the carrier, turning them upon their sides, and delivering them to said track or tracks.

26. In a system for treating canned goods, an endless carrier adapted to receive the cans on end, a racking-frame, consisting of a series of tracks within which the cans may roll, said racking-frame being mounted adjacent the endless carrier and movable parallel therewith, a chute leading from the side of said carrier to the racking-frame, and means carried by the racking-frame for turning the cans upon their sides and discharging them into the chute.

27. In a system for treating canned goods, an endless carrier arranged to receive the cans on end, means for arranging said cans in several longitudinal series upon said carrier, a racking-frame adjacent said carrier, and movable parallel therewith, a series of chutes leading from the side of said carrier and carried by the racking-frame, a series of guides extending diagonally over said carrier and supported by said chutes, and means for turning the cans upon their sides and discharging them into the chutes.

28. In a system for treating canned goods, an endless carrier mounted in position to receive the cans upon end from capping-machine or other source of supply, a divider arranged over said carrier in position to be engaged by the cans and to move said cans alternately in opposite directions transversely of the belt, a second endless carrier, a rotary disk mounted between the two carriers in position to receive the cans from the first carrier and to deliver them to the second carrier in two series, a pair of dividers mounted above the second carrier in position to divide each series of cans into two series, four channels extending diagonally across the second carrier and each ending upon one edge of the carrier, a platform of less width than a can diameter forming a continuation of each channel and extending transversely from the side of the carrier, and a chute mounted beneath and adjacent each platform, for the purpose set forth.

29. In a system for treating canned goods, a cooling-rack, consisting of a series of open tracks into which the cans may be rolled from one end and within which the cans may roll, means for closing or opening said tracks at each end, and means for oscillating the rack so as to cause a rolling reciprocation of the cans within their tracks.

30. In a system for treating canned goods, an oscillatory platform, a cooling-rack mounted thereon and consisting of a series of open tracks within which the cans may roll, and means for closing or opening the ends of said tracks.

31. In a system for treating canned goods, an oscillatory cooking-retort, a series of tracks, within which the cans may roll, arranged in said retort, an oscillatory platform mounted adjacent said retort, a track-frame consisting of a series of open tracks, within which the cans may roll, mounted upon said platform, means for closing the ends of said tracks, and means for bringing said tracks into conjunction with the tracks of the retort, for the purpose set forth.

RALPH B. POLK.

Witnesses:
ARTHUR M. HOOD,
BERTHA M. BALLARD.